Patented May 2, 1933

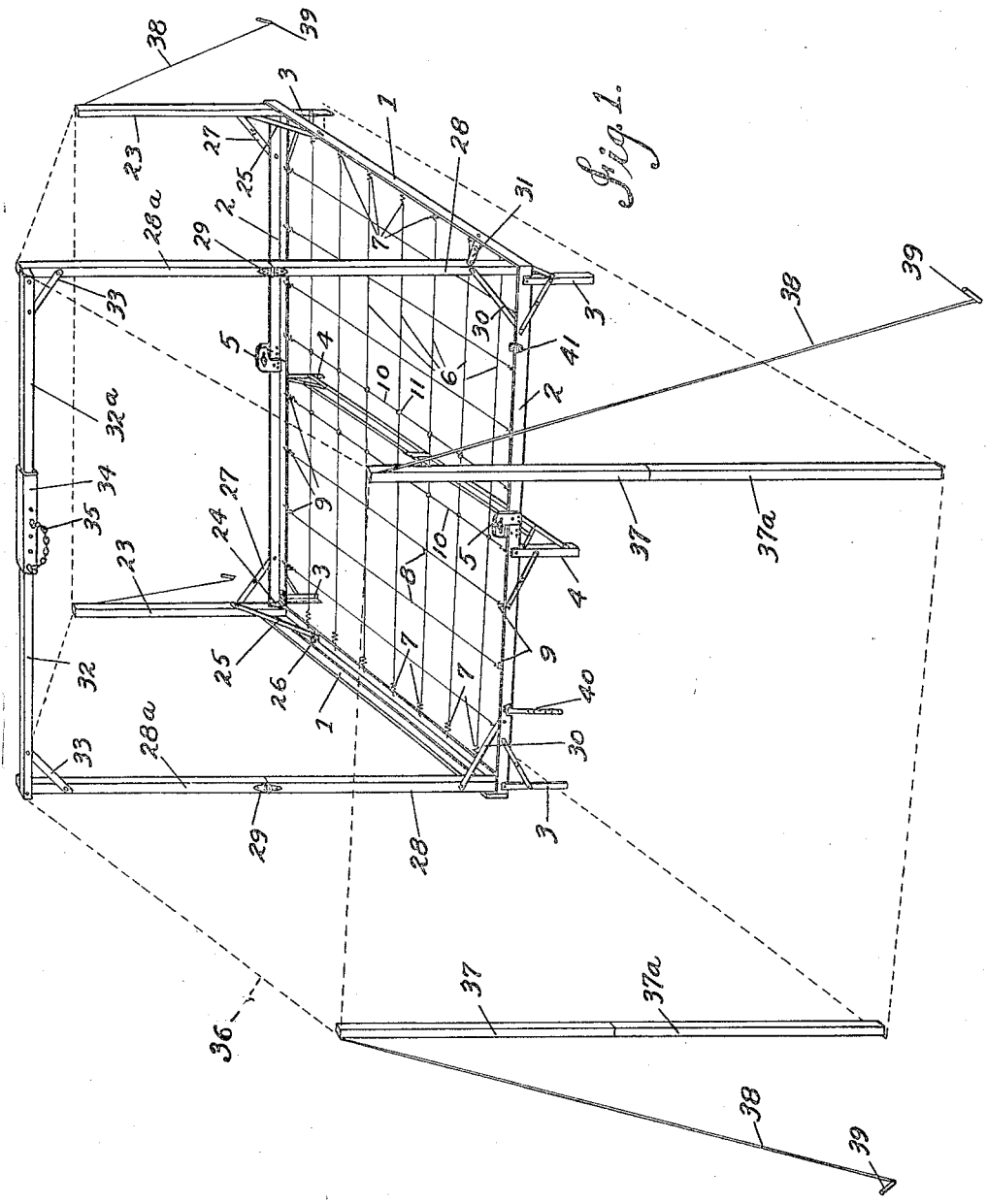

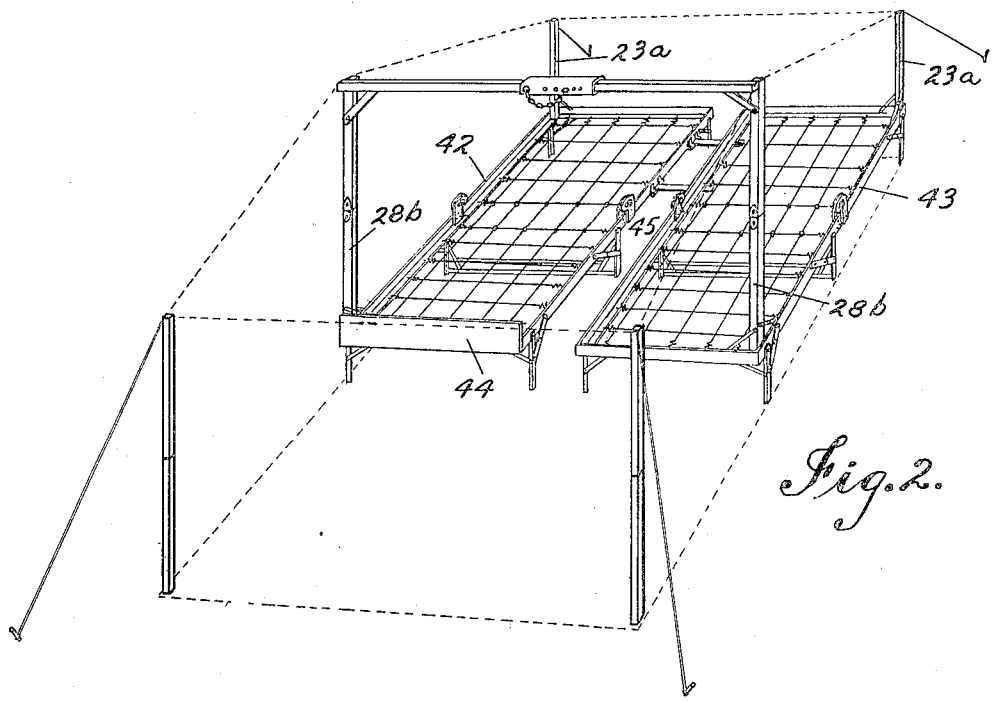
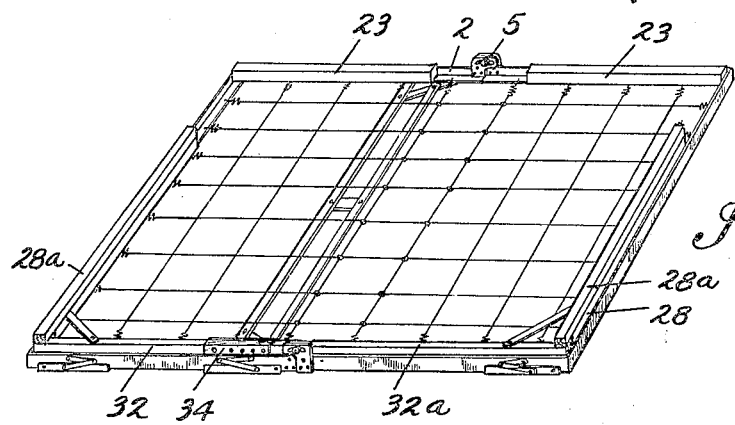
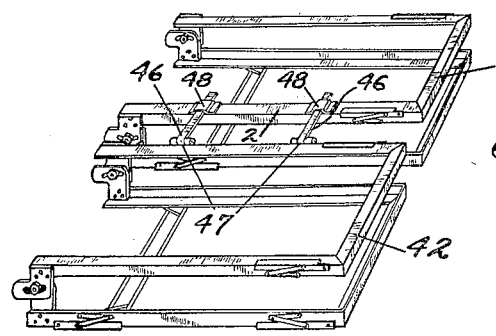

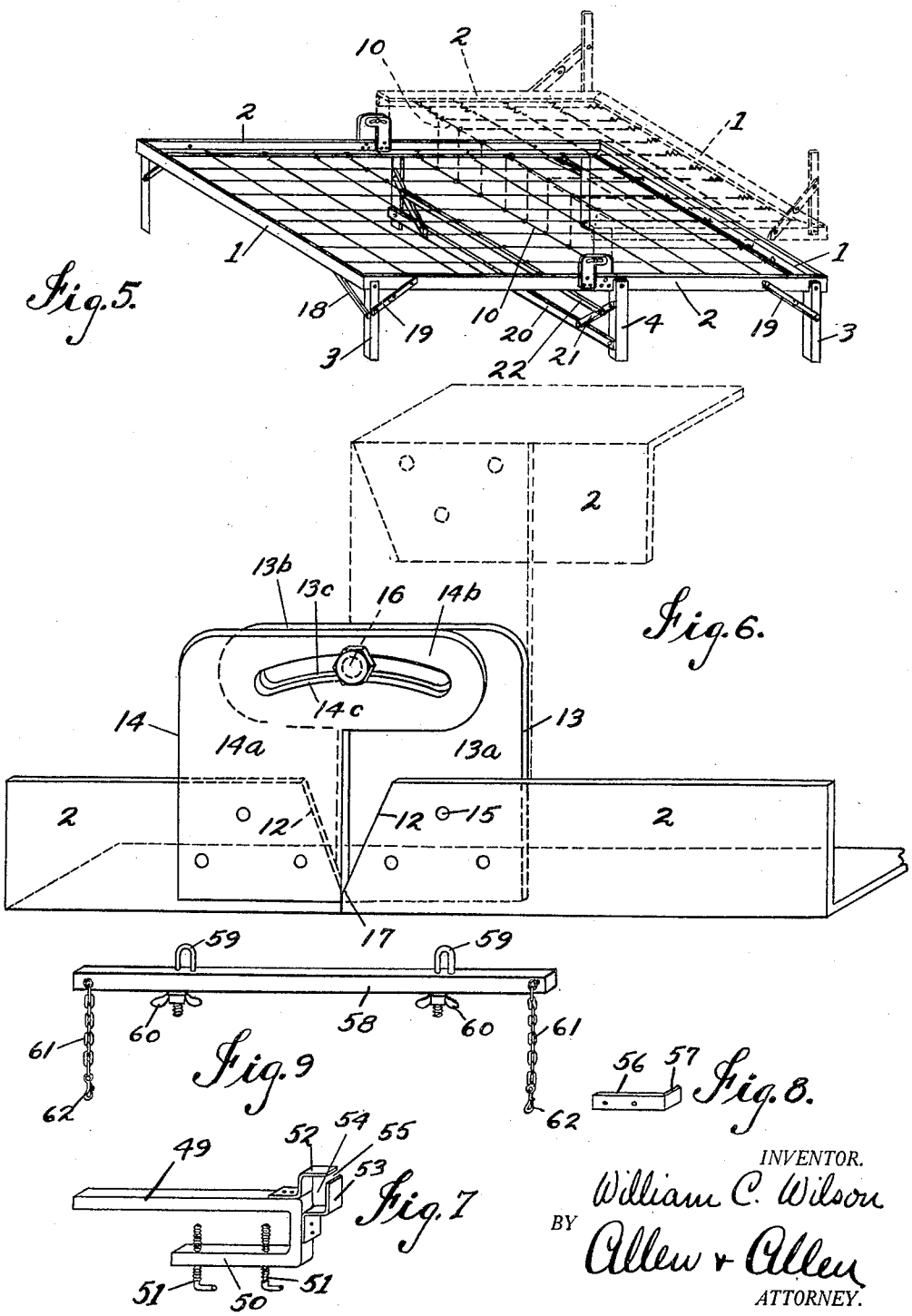

1,906,828

UNITED STATES PATENT OFFICE

WILLIAM C. WILSON, OF CINCINNATI, OHIO

PORTABLE BED AND TENT STRUCTURE

Application filed July 7, 1930. Serial No. 466,134.

My invention relates to improvements in portable combinations of bed and tent structures such as may be carried conveniently upon the outside of an automobile, although my structure may be transported and used entirely independently.

An object of my invention is to provide in a self-contained unit a combination of tent, supporting structure for the tent, and a bed or beds. Another object of my invention is to make in such a structure, provision for the knock-down assembly thereof into a small, relatively light and very compact unit for transportation. Still another object of my invention is the provision of a combination bed structure and tent supporting structure which is a foldable and compact unit. A further object of my invention is the provision in such a structure of means whereby the tent, the mattresses, the bed clothing and such extra tent fittings as may be employed, may be included within and protected by the bed structures when assembled in folded or knock-down relationship. A further object of my new invention comprises the provision of means whereby such a knock-down assembly may be affixed to and carried upon an automobile. A further object of my invention is the provision of a novel structure of bed frame and springs, which permits not only of the folding of the parts into a smaller compass, but also for the inter-folding of parts and the interspacing thereof to permit the carrying within the bed structure of the aforementioned equipment such as the tent and the bed clothing.

These and other objects of my invention which will be set forth hereinafter or will be apparent to one skilled in the art upon reading these specifications, I accomplish by that certain construction and arrangement of parts of which I shall now describe a preferred embodiment and a modification thereof, reference being had to the drawings which form a part of these specifications.

In the drawings:

Figure 1 is a perspective view of a preferred form of my structure in set up relationship.

Figure 2 is a perspective view of a modified form in set up relationship.

Figure 3 is a perspective view of the bed structure in the embodiment of Fig. 1, with the legs and the tent pole supporting structure in folded relationship.

Figure 4 is a skeleton view of the double bed structure of Fig. 2 in knock-down assembly.

Figure 5 shows the bed structure of the modification of Fig. 1 folded over upon itself.

Figure 6 shows the hinge mechanism which permits the knock-down assembly of the bed structures.

Figure 7 shows a fitting which may be attached to the running board of an automobile to receive the head board of one of the beds when the device in my invention is to be used for automobile transportation.

Figure 8 shows an attachment member which is fastened to the head board for engagement with the device of Fig. 7.

Figure 9 is a device hereinafter to be described for use in mounting my knock-down assembly upon an automobile.

A consideration of Figure 1 broadly will indicate that I provide in my invention a combination of a bed structure and means for supporting a tent thereover, said means being, excepting as to supports for an extension of the tent, a part of the bed structure. I have indicated a bed comprising a rectangular frame formed of end rails 1 and side rails 2, together with a spring structure hereinafter to be described. I provide legs for the bed at the corners indicated at 3, and a central supporting member hereinafter more fully to be described comprising legs 4. The side rails 2 of the bed are broken in the center, and are fastened together by a hinge construction indicated generally in Fig. 1 by numeral 5. This hinge construction permits the folding over of the two half sections of the bed, one upon the other, so that the bed may be caused to occupy a smaller space. Such a relationship of the folded over parts is clearly illustrated in Figure 5, and will be more fully hereinafter explained. Reference to Figure 5, however, will show that in the folded over position of my bed halves, it is my purpose to provide such an interspaced relationship of the parts as will enable me to achieve in the folded over or knock-down construction, a box-like arrangement with a central space suitable for the inclusion and storage of the mattress, bedding, tent, extra poles and the like.

In the preferred embodiment of my bed structure the side and end rails are formed of angle irons of as light a construction as is consistent with the necessary strength, and I preferably form my frame with the horizontal parts of the angle irons upon the bottom and extending inwardly of the bed. I attach my spring structure to the said parts of the rails; and I have shown in Figure 1 a plurality of longitudinal tensioning members, wires or rods 6 held and tensioned at the end rails by coil springs 7. I have also shown a plurality of transverse tensioning members 8 held and tensioned at the side rails 2 by coil springs 9. Interspaced equally on either side of the hinges 5, I have shown transverse tension members 10, and it will be seen that the longitudinal tension members 6 are jointed as at 11 adjacent the two central transverse tension members 10. This arrangement of the springs, as indicated quite clearly in Fig. 5, will enable the springs to assume a box shape when the bed is in the folded over position. The two central lateral ties or tension members 10 being vertically interspaced when the bed is in knock-down position, and connected by the central jointed portions of the longitudinal tie members 6. From a consideration of Fig. 5 also, it will be readily understood how my bed, when in folded over position, presents a relatively large central space for the storage of other articles.

In order that the two halves of the side rails 2 of the bed may be held in properly interspaced position when the bed is folded over (not only to provide storage space for the tent and bed clothing as aforementioned, but also to provide space for the inter-folded tent poles as I shall hereinafter more fully describe) I have devised a special hinge construction to permit the folding of the bed. It will be clear from a consideration of the problem involved, that a hinge construction must be provided in which the pintle is interspaced by means of suitable members from the side rails of the bed. It is not practicable, however, to use the pintle as a primary pivot for the reason that the longitudinal tension members of the bed will then tend forcibly to hold the bed in stretched out relationship; and when it is desired to fold the bed over on itself, it is necessary forcibly to break the side rails. This cannot be done conveniently by one man. After considerable experimentation, I have devised a type of means which I shall now describe, and in which the pintle does not act as the primary pivot point. This hinge is illustrated in Fig. 6. Side rail sections 2 are beveled as at 12, and hinge plate members 13 and 14 are fastened to the side rail sections by riveted spot welds 15, or other suitable means. One of the hinge plates is fastened inside one of the side rail sections 2, and the other on the outside of the corresponding section. The hinge plates comprise body sections 13a and 14a respectively, which extend upwardly of the side rails, and bear at their upper ends right and left hand projections respectively, 13b and 14b. The pintle has a suitable bolt 16, as will be readily understood. Instead of providing for the bolt 16 a hole through the projections of the hinge plates, in which construction the pintle would act as the pivot point and the bed would be difficult to break, I provide slots 13c and 14c respectively, and the pintle 16 passes through these slots. In this construction when I desire to fold over my bed as shown in Figure 5, the primary pivot point is the point of engagement of the beveled ends of the side rail sections 2, and is indicated in Fig. 6 at 17. This point is substantially in horizontal alignment with the base of the angle irons comprising the side rails 2, and consequently substantially in line with the pull of the longitudinal tension members 6 of the bed spring construction. Consequently no substantial force is required to break the bed, and indeed as soon as a very slight angular relationship has been given to the parts of the bed, the tension of the longitudinal tie members 6 assists the further folding over action. The pintle 6 slides in the slots 13a and 14c to the end thereof, at which point, however, it begins to act as a pivot. The pintle bolt is therefore not tightened on the hinge plates, although in my preferred construction it is supplied with a lock nut. When in extended relationship the weight of the two parts of my bed is sufficient to maintain the parts in the desired positions. I may, however, if desired, equip the pintle bolt 16 with a wing nut so that it may be tightened with the bed either in extended or folded over condition. I have found, however, that this is not necessary. The dotted lines in Figure 6 show the relationship of the side rail sections in folded over position.

The legs 3 of my bed are preferably formed of pieces of angle iron braced by braces 18 which are pivoted against the end rails 1 of my bed, and also by broken links 19. Thus these legs may be folded back against the bottom of the bed by breaking the links, as will be readily understood, and as is shown quite clearly in Figure 4. Since I have adopted for the reasons hereinabove described, a bed spring construction comprising lateral tension members 8 and 10, I provide a bracing construction for the central portion of my bed which will serve to keep the side rail sections 2 in proper parallel relationship, and will prevent their breaking inwardly of the bed. Thus as is shown most clearly in Figure 5, I provide the center legs 4 of my bed with an interconnecting strut 20 within the bottoms thereof, and bracing means 21 designed to hold the legs at right angles to the strut 20. A second strut 22 rigidly connects the braces 21 so that the legs 4 are rigidly held in interspaced parallel relationship. These legs 4 are shown pivoted upon the side rail sections 2, and the struts and bracings just described will clearly operate through these legs at their pivot points to hold the side rails 2 in proper parallel relationship against the tension of the lateral ties 8 and 10 of the bed spring construction. The upper strut 22 is positioned sufficiently below the bed spring construction to allow for its sagging under the weight of an occupant. I form my legs 3 and 4 of pieces of angle iron so disposed and pivoted with reference to the frame of the bed as to fold down thereagainst, the several portions of the angles forming the side rails of the bed, and the legs themselves lying in nested relationship when the legs are folded over. In this way I greatly economize space.

In my preferred construction the tent poles are preferably a part of the bed construction and are so attached thereto that they will fold therewith into a small compass. I have shown in Figure 1, end tent poles 23 located at the corners of my bed and held there by hinges 24. These poles are braced upon one side by braces 25 which are pivoted to the end rails of the bed as at 26. Broken link braces 27 are also provided and it will be clear that upon the breaking of these links the poles 23 may be folded down against the side rails 2 so as to lie partly, at least, within the angle of the said rail. Depending upon the sides of my tent construction, the tent poles will be larger or smaller in accordance with strength requirements. In one embodiment I form the end poles of hickory about an inch square. The center poles may be of heavier construction. The length of the end poles may be substantially the length of half the side rails 2 and I have found that this gives me adequate clearance. I also provide center poles in joined sections 28 and 28a joined by hinges 29. Similarly to the end poles 23, the center pole sections 28 will be hinged to the end rails 1, held by braces 30 and by broken link constructions 31 so that the end pole sections 28 can be folded down so as to lie along and within the angles of the end rails 1, the sections 28a folding over on top of the sections 28. I provide a ridge pole comprising sections 32 and 32a each section fastened to a center pole section 28 and braced at right angles thereto by braces 33. The two center pole sections, when in assembled relationship, are connected by a sleeve 34 of sheet metal held in place by a pin fastened to a chain 35 as will be readily understood. The pin is inserted through a hole in the sleeve 34 and in the ridge hole sections 32 or 32a. When it is desired to fold up the tent pole and bed construction, the pin is removed and the sleeve is slid back upon one of the sections 32 or 32a so as to be out of the way. Upon the other section there is preferably a stop which may be in the form of a bolt or rivet; and the sleeve may be provided with a plurality of holes so that the tent may be tightened by lengthening the ridge pole. The relationship of the folded parts is clearly shown in Figure 3 where both the tent poles and the legs have been folded against the bed frame but the bed frame has not been folded over upon itself.

The tent is indicated in dotted lines in the several figures at 36. Where the tent is of such a construction as to provide for a living room, supplementary tent poles are provided. These may comprise sections 37 and 37a hinged together so that these poles will fold in half or in some other multiple, into such lengths as may be included within the body of the bed when folded over as shown in Figure 5. The usual guy ropes 38 may be provided where desired and when the tent is set up, may be held by the usual pegs 39.

It will be understood that the supplementary tent poles 37 and 37a, the tent 36, the necessary mattress for the bed, the bed clothing, the guy ropes, the tent pegs, and other equipment, may be placed upon the bed when it is in the extended position shown in Figure 5 and the bed thereupon folded over on itself as shown in the dotted lines in Figure 5. The legs may then be folded down as described and as shown in Figure 3 and the entire equipment will then be included within a very small compass. When the bed is folded over, the straps 40 shown as attached to the side rails 2 in Figure 1, may be engaged with buckles 41 also attached to the side rails and the bed and other equipment thus fastened into a compact bundle. A casing of canvas may be slipped over this bundle so as to protect it and it may then be carried upon the running board of a car or otherwise as desired. It sets up into a sturdy bed and tent construction with a minimum of labor and in a minimum time. It is relatively light, the parts having such a construction and being so proportioned as to have the minimum weight consistent with the necessary strength. Hitherto for the most part, the commercial types of tents for auto tourists have been of separate construction and it has been necessary for the tourist to carry the tent as a separate package and such cots and bedding as he has required in addition thereto. While beds especially designed for tourist tents have been constructed, they have in general been extremely heavy and have not folded into compact structures like mine. In such folding beds as have hitherto been designed, adequate provision has not been made for the inclusion within the beds of the tent, the mattress, the bed clothing, and the like so that a single unitary package could be made thereof.

In the embodiment of my invention shown in Figures 2 and 4, I have provided a construction embodying two folding beds especially of the unitary bed type of the first modification. The specific construction of these beds does not therefore need special description. I provide the same construction of end legs, center legs, and struts and I also provide tent poles of essentially the same structure arranged to fold into the bed but since where two beds are employed, it is preferable to have the beds extending lengthwise of the tent, I have reversed the brackets holding the tent poles so that the end tent poles 23a fold down against the end rails of the bed and the center tent poles 28b fold down against the side rails of the beds. I have indicated in Figure 2 the left hand bed by the numeral 42 and the right hand bed by the numeral 43. To the left hand bed I have shown attached a head board 44 affixed to the end rail in a suitable manner. In Figure 4, I have shown a skeleton view of the two beds in folded over relationship, omitting some of the parts for the sake of clearness. It will be understood that where two beds are employed, the tent may be folded and stretched between the beds and across the aisle 45 formed between the beds when they are in set up relationship. This gives additional space. The beds are interconnected in this modification by straps 46 of metal pivoted to the corner of the side rails of the bed 42 as at 47 and held in sleeves 48 on the lower part of the side rail 2 of bed 43. When the beds are in the position shown in Figure 4, the bed 43 may be lifted up and laid on top of the bed 42 thus forming a self-contained relatively small package. The assembly of two beds is very much like the assembly of the single bed excepting that it will be double the thickness thereof, the over-all dimensions of the package, of course, being determined by the size of the beds. In either modification, the beds may be single, three-quarters, or double beds, as desired. When one of the beds is folded over on top of the other, the straps 46 slide in the sleeves 48 so that the beds may be positioned in contact and alignment. Stops not shown are preferably provided upon the unhinged ends of the straps 46 so that when the beds are set up as shown in Figure 2, they may be pulled apart, one from another to the extent permitted by the said stops, the said stops then defining the width of the aisle 45. This is necessary in a set up construction comprising two beds in order that the tent may be properly fitted and braced.

What I desire to use either modification of my structure, upon the running board of an automobile, I prefer to employ for this purpose the fittings shown in Figures 7, 8, and 9. I attach to the running board clamp members shown in Figure 7 having a portion 49 to overlie the running board and a reversely bent clamp portion 50 to underlie it and provided with set screws 51. Strap members 52 and 53 are attached to the clamp member so as to leave a rectangular interspace 54 and a slot 55. To the head board of my bed (and a head board may be used with the single bed modification as well as the double bed modification) I attach the fittings shown in Figure 8. This fitting is a strap of metal having an attachment portion 56 and a reversely bent portion 57. One of these fittings is attached to each end of the head board so that the reversely bent portion 57 and a portion of the member 56 extends therebeyond and the fittings of Figure 7 are placed upon the running board of a car in such a way that the projecting ends of the fittings of Figure 8 may be engaged within the rectangular portion 55. When the folded bed is in horizontal position, the projecting portions of the fittings of Figure 8 may be inserted in the slots 55 and then when the bed sections are tilted to vertical position, this fitting as will readily be understood, will turn in the rectangular portion 54 and cannot be withdrawn through the slot 55. When this engagement is effected and the bed or beds are tilted up into vertical position, the head board will rest between the clamp members 49, and the bed in an integral package will then be resting upon the running board of the car. To hold it in such a position as well as to hold it away from the body of the car, I provide the fitting shown in Figure 9. This comprises a bar preferably of wood 58 which carries hook bolts 59 provided with wing nuts 60. These hook bolts are positioned on the bar 58 so that they may be engaged over the door handles of the car. Upon tightening the wing nuts 60, the bar is thus fastened to the door handles. The length of the bar will be substantially that of the length of the package or folded assembly of bed or beds, tent, etc. To the ends of the bar I attach chains 61 provided with snaps 62 at their ends and I engage these snaps with any suitable members upon the bed or beds.

Thus I have provided a self-contained foldable structure embodying a bed or beds, bed clothing, and the like, a tent, and a supporting structure therefore which may be quickly and easily assembled or disassembled and folded into a package of relatively small compass. When so folded this package may quickly and easily be attached to the running board of a car so as to be transported thereby.

Having thus described my invention, what I claim as new and desire to secure by Letters Patent, is:

1. In a foldable bed a frame comprising side rails and end rails of angle iron, said side rails being broken in the center to form half sections, an upstanding hinge plate connected with an end of each of said sections on each of said broken rails, said hinge plates having oppositely extending projections, slots in said projections, and a pintle operating in said slots, said pintle forming a secondary pivot point the meeting ends of said rail sections being beveled, said hinge plates being so disposed that the rail sections are in alignment, the meeting parts of said rail section forming a primary pivot point, and the beveled portions thereof allowing relative pivotal movement of said rail sections.

2. In a combined tent and bed structure a pair of beds comprising frames, bed springs and foldable legs, said beds foldable in substantial halves upon each other, a hinge construction adapted to hold the folded over sections of said beds in interspaced relationship, the means defining an aisle between said beds, said means comprising a hinged slidable interconnection.

3. In a combined bed and tent structure, a pair of beds comprising frames and springs foldable upon themselves in substantial half section, and hinge means for holding said half sections in interspaced relationship, to receive tent poles and a tent and the bedding between said half sections, and a connection between corresponding sections of said beds, said connection comprising a metallic member pivotally connected with one of said sections and slidably connected with the other of said sections to define an aisle therebetween, and to facilitate the folding of one of said folded beds upon the other of said folded beds.

4. In a collapsible bed frame, end rails and side rails formed of angle iron, so disposed that one of the angles is in a horizontal plane inward and the other angle is vertical, the side rails of said bed being in two sections, the vertical angle of each inner end of the side rail sections being beveled, a hinge member riveted thereto, said hinge member having a pintle in a plane above the lower line of side rails whereby the lower inner end of one rail section forms a primary pivot by contact with the lower inner end of the other section in one operation of closure and the elevated pintle acts as a secondary pivot in the final operation of closure, a bed spring construction attached to the horizontal member of the angle irons, said spring construction comprising lateral and longitudinal tension members, a lateral tension member equally spaced on each side of said hinge members whereby said bed may be folded over on itself in half, the halves being interspaced, and the spring construction taking the form of a box, the said equal spaced lateral tension members forming one of the edges thereof.

5. In a combined tent and bed structure a pair of beds comprising frames, bed springs and foldable legs, said beds foldable in substantial halves upon each other, a hinge construction adapted to hold the folded over sections of said beds in interspaced relationship, and means defining an aisle between said beds, said means comprising a hinged slidable interconnection having stop means on its ends.

WILLIAM C. WILSON.